US006954437B1

(12) United States Patent
Sylvest et al.

(10) Patent No.: US 6,954,437 B1
(45) Date of Patent: Oct. 11, 2005

(54) METHOD AND APPARATUS FOR AVOIDING TRANSIENT LOOPS DURING NETWORK TOPOLOGY ADOPTION

(75) Inventors: Mikael Sylvest, Birkerød (DK); Soren Heilmann, Copenhagen (DK)

(73) Assignee: Intel Corporation, Santa Clara, CA (US)

( * ) Notice: Subject to any disclaimer, the term of this patent is extended or adjusted under 35 U.S.C. 154(b) by 917 days.

(21) Appl. No.: 09/609,307

(22) Filed: Jun. 30, 2000

(51) Int. Cl.[7] .............................................. H04L 12/28
(52) U.S. Cl. ....................................................... 370/256
(58) Field of Search ................................ 370/254, 255, 370/256

(56) References Cited

U.S. PATENT DOCUMENTS

| | | | |
|---|---|---|---|
| 5,276,789 A | 1/1994 | Besaw et al. | |
| 5,481,674 A | 1/1996 | Mahavadi | |
| 5,606,664 A | 2/1997 | Brown et al. | |
| 5,606,669 A | 2/1997 | Bertin et al. | |
| 5,706,440 A | 1/1998 | Compliment et al. | |
| 5,727,157 A | 3/1998 | Orr et al. | |
| 5,732,086 A | 3/1998 | Liang et al. | |
| 5,734,824 A | 3/1998 | Choi | |
| 5,825,772 A | 10/1998 | Dobbins et al. | |
| 5,884,036 A | 3/1999 | Haley | |
| 6,061,723 A | 5/2000 | Walker et al. | |
| 6,111,858 A | * 8/2000 | Greaves et al. | 370/256 |
| 6,122,283 A | 9/2000 | Lee | |
| 6,188,675 B1 | 2/2001 | Casper et al. | |
| 6,205,122 B1 | 3/2001 | Sharon et al. | |
| 6,456,599 B1 | 9/2002 | Elliott | |
| 6,515,969 B1 | * 2/2003 | Smith | 370/256 |
| 6,535,491 B2 | * 3/2003 | Dutt et al. | 370/256 |
| 6,590,861 B1 | 7/2003 | Vepa et al. | |
| 6,611,502 B1 | * 8/2003 | Seaman | 370/256 |

OTHER PUBLICATIONS

Tobagi et al, study of IEEE 802.1p GARP/GMRP Timer Values, Computer Systems Laboratory, Department of Elecrical Engineering, Standord University, 1997.

* cited by examiner

Primary Examiner—Chau Nguyen
Assistant Examiner—Christine Ng
(74) Attorney, Agent, or Firm—Robert D. Diehl

(57) ABSTRACT

A master node in a network reports a spanning tree to a distributed dictionary. A plurality of nodes comprising a network including the master node access the distributed dictionary to adopt the spanning tree. The spanning tree is adopted in a coordinated manner to avoid potential transient topology loops in the network. In one embodiment, adopting the spanning tree in a coordinated manner involves disabling all links in the node that are to be disabled prior to enabling new links.

20 Claims, 11 Drawing Sheets

(12)   United States Patent   US 6,954,437 B1

METHOD AND APPARATUS FOR AVOIDING TRANSIENT LOOPS DURING NETWORK TOPOLOGY ADOPTION

FIELD OF THE INVENTION

The present invention pertains to the field of networking. More particularly, this invention relates to avoiding transient loops while adopting a new network topology.

BACKGROUND

Networks allow individual devices to take advantage of one another to share information and resources, provide redundancy, increase accessibility, and so on. Networks are used in every day life at home, at work, on vacation, and just about everywhere else. A typical user does not want to know how a network operates. A typical user just wants the networks he or she encounters in daily life to work and work well. Unfortunately, network technology is exceptionally complex. All too often, highly skilled, and very expensive, technicians are needed to set up and maintain networks. The power and versatility of networks, however, virtually guarantee a continued and growing demand for better, more reliable, faster, and more user friendly networks and network equipment.

BRIEF DESCRIPTION OF THE DRAWINGS

Examples of the present invention are illustrated in the accompanying drawings. The accompanying drawings, however, do not limit the scope of the present invention. Similar references in the drawings indicate similar elements.

DETAILED DESCRIPTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Four related inventions are described herein. Embodiments of each invention improve aspects of communication among network equipment to improve, for instance, network configuration and management. All four inventions are described below in the context of a network of data switches. The inventions, however, are not limited to the illustrated embodiments, and are generally applicable to a wide variety of networks including, for instance, a local area network (LAN).

Figure 1:
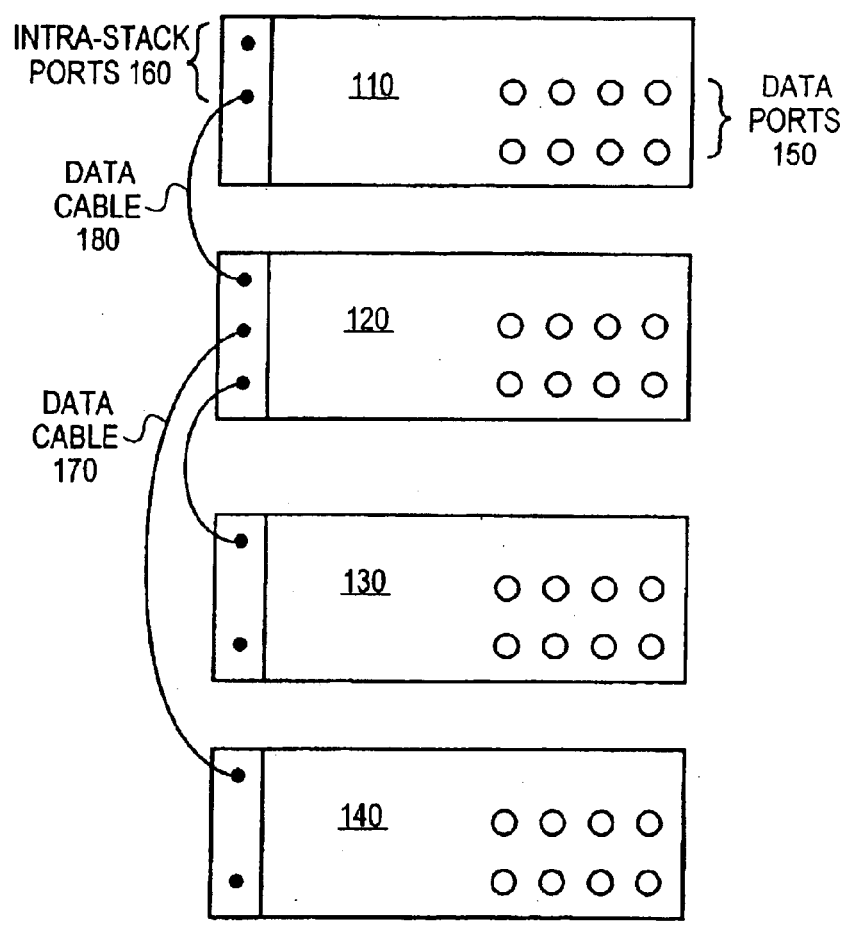
FIG. 1 illustrates one embodiment of the present inventions.

FIG. 1 illustrates four data switches, 110, 120, 130, and 140. Each switch includes eight data ports 150. Other embodiments may include a different number of ports per switch and other embodiments may not have the same number of ports on each switch. The switches can be used to connect various devices, such as telephones, computers, facsimile machines, printers, networks, etc. When a data packet is received at a particular data port, the switch determines where the packet is supposed to go, and sends the packet to the appropriate data port.

Each data switch can be used alone. For instance, a switch having eight data ports can connect eight different devices. If a user wants to connect more devices than one switch can handle, the user can use multiple switches. For instance, if a user wanted to couple 14 devices using switches with eight data ports, the user could couple seven devices to one switch and seven devices to another switch, and then couple the two switches together with the eighth port on each switch.

Combining switches using data ports, however, can quickly become complicated. A user needs to map several ports from one switch into one port on another switch. The more switches that are combined, the more difficult it becomes to configure and manage the switches.

In the embodiment illustrated in FIG. 1, each switch includes a number of dedicated ports, intra-stack ports 160. The intra-stack ports 160 are designed specifically for stacking switches together. The four switches stacked in FIG. 1 each have eight data ports, so the combined stack can connect 32 devices. Other embodiments may include larger or smaller numbers of switches, having any number of ports per switch.

If a packet of data arrives at a data port on switch 140, and the data packet is intended to be sent to a device coupled to a data port on switch 110, switch 140 will forward the data packet to switch 120 through data cable 170. Switch 120 will in turn forward the data packet through data cable 180 to switch 110. Each switch needs to know the topology of the stack in order for the stack to work properly as one big switch. That is, each switch needs to know which switches are coupled to which of its intrastack ports 160.

Various embodiments of the present inventions can be used to automatically manage the topology of the stack so that, for instance, configuring the stack topology to operate like a single large switch can be as simple as plugging in a few data cables, switches can be added or removed from the stack as needed with little interruption in service, etc. The advantages of a self-managing network of switches are numerous. For example, a user can simply couple the switches together in any random order, let the switches configure themselves, and begin using the stack.

Specifically, embodiments of the present inventions include:

1) A distributed dictionary to provide a unified view of network attributes to each node in a network having an unknown topology, 2) An adjacency monitor to recognize adjacencies between nodes, designate a master node, and report the adjacencies to the distributed dictionary, 3) A master node to generate a topology based on adjacencies reported to the distributed dictionary, and 4) The master node to coordinate adoption of the generated topology among slave nodes.

Figure 2:
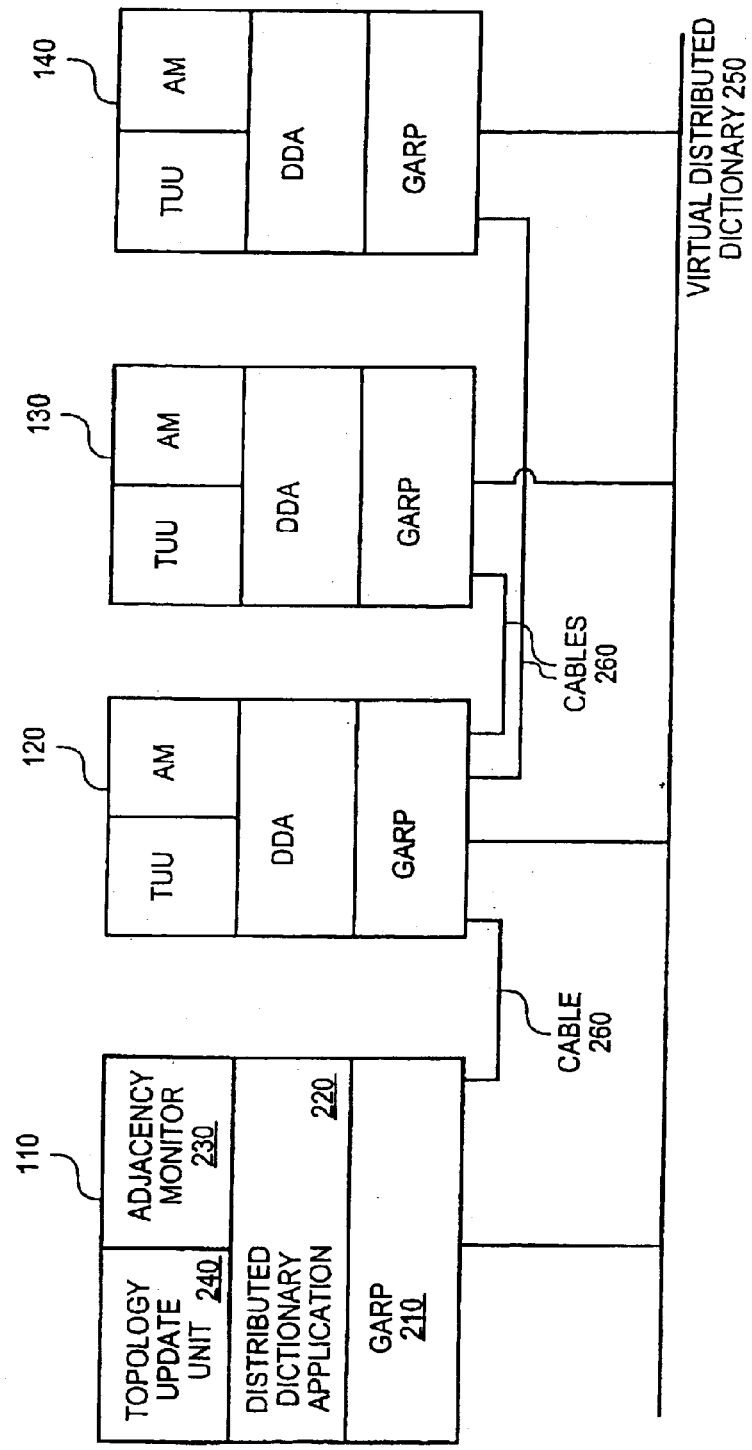
FIG. 2 illustrates another embodiment of the present inventions.

FIG. 2 illustrates various embodiments of the four inventions. Each of the switches, 110, 120, 130, and 140, includes a generic attribute registration protocol (GARP) 210, a distributed dictionary application 220, an adjacency monitor 230, and a topology update unit 240.

Standard GARP (IEEE std. 802.1) is a known networking protocol that connects applications, such as distributed dictionary application 220, to physical ports, such as intra-stack ports 160, within network nodes. GARP is designed to operate in a network having a known topology. GARP uses the topology to know which ports lead to which nodes. For instance, when GARP receives a packet of data, GARP can identify a destination for the packet, consult the known topology to determine which port leads to that destination, and forward the packet accordingly.

GARP can receive packets either directly from an application within the same node or from a separate node on a physical port. For instance, if there is no direct connection between two nodes, in order to send a packet of data from the first node to the second node, the data must be forwarded through one or more intervening nodes. GARP in the first node will receive the packet from an application at a virtual port and forward the packet to a physical port. GARP in the intervening node(s) will receive the packet at a physical port and forward the packet to a physical port. GARP in the destination node will receive the packet at a physical port and forward the packet to a virtual port for an application.

GARP's ability to forward packets can be used to multicast information. For instance, if an application wants to multicast a packet of data, the application can send the packet to GARP. GARP can forward the packet to each "enabled" port. For standard GARP, an "enabled" port includes every port that has a cable connecting to another node in the network topology. When GARP receives a multicast packet from a port, GARP can report the packet to an application in the same node, and forward the packet on to all enabled ports other than the port from which the packet was received. If each GARP in each node in the network similarly forwards a multicast packet, the packet will eventually be distributed throughout the network.

Standard GARP, as described above, is designed to rely on a known topology. The illustrated embodiments of the present inventions, however, use a modified version of GARP which does not rely on a known topology. Further references to GARP will be to GARP as modified according to the present inventions. Other embodiments may use any number of other distribution tools to perform the functions of GARP described below.

Distributed Dictionary in a Network Having an Unknown Topology

Distributed dictionary 250 is discussed below with respect to topology management, but it has much broader applicability. It can be used, for instance, to distribute virtually any information throughout a network, and is especially suited to distribute information in a network having an unknown topology.

As shown in FIG. 2, GARP 210 and distributed dictionary application 220 in each of the four switches collectively provides the inventive stack-wide virtual distributed dictionary 250. Anything that is stored to dictionary 250 by one switch can be seen by all of the switches. Virtual dictionary 250 is merely a conceptual convenience. In reality, information that is "stored" in virtual dictionary 250 is actually distributed to the various nodes using GARP and stored locally at each node by each of the separate distributed dictionary applications 220.

Storing information to the dictionary is called "registering" the information. GARP multicasts distribution of the data so that the data is forwarded throughout the network. If a switch "deregisters" information, the information is removed from each node. Information can be removed in more than one way. For instance, information registered to distributed dictionary 250 may have a limited life span. If the information is not updated regularly, the information may simply disappear over time. Alternately, GARP may provide for more direct deregistration by, for instance, multicasting an instruction to delete certain information.

Registering and deregistering information could be accomplished in a fairly straight forward manner in a network having a known topology. The information can be distributed along known paths to known destinations. As discussed below however, registering and deregistering information becomes more challenging in a network having an unknown topology.

Figure 3:
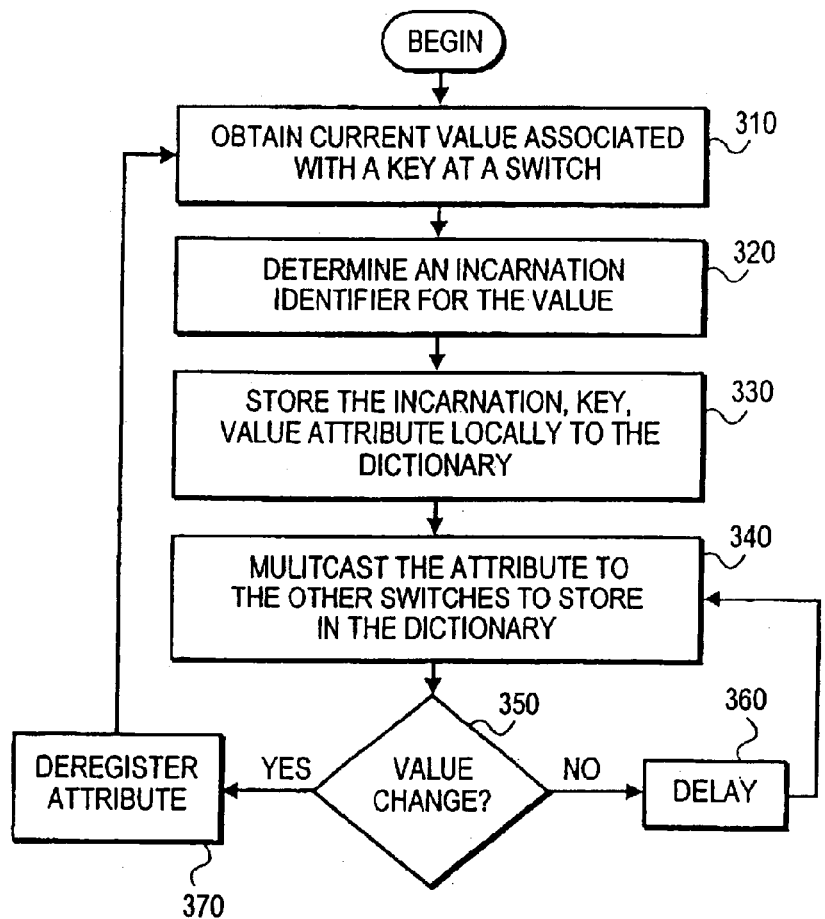
FIG. 3 demonstrates one embodiment of a distributed dictionary.

FIG. 3 illustrates one embodiment of the first invention. The illustrated process is used by an individual switch to monitor and update its own state, as well as report information to the distributed dictionary for all of the other switches to see.

In block 310, the switch obtains a current value associated with a key. A key is used as an index in the distributed dictionary. In the context of topology management, a key may be an identifier for a particular switch and an identifier for a particular intra-stack port on the switch. That is, a network topology can be defined in terms of switches and ports. The distributed dictionary may include an entry for every switch and port in the network that has a cable coupled to it. In which case, the value associated with each key may be an identifier for a neighbor switch and its port connected to the switch and port indexed by the key.

Each switch has a unique media access control (MAC) address and each port has a port number. So, MAC addresses and port numbers can work well for switch identifiers. For instance, a key/value pair may look like, key=(own MAC address, own port number), and value=(neighbor's MAC address, neighbor's port number).

In block 320, the switch determines an incarnation identifier for the value obtained in block 310. An initial incarnation is likely to be one. If, for instance, the topology has changed more than once, the incarnation will be incremented, or advanced, for each change. The incarnation identifier makes it possible to identify the most resent value associated with a key. Together, the incarnation identifier and the key/value pair can be referred to as an "attribute."

Blocks 330 and 340 comprise one embodiment of registering an attribute. In block 330, the key/value pair is stored locally in the switch's distributed dictionary application, along with the incarnation identifier for the value. In block 340, the switch multicasts the attribute to the rest of the switches to be stored by the respective distributed dictionaries.

GARP can be used to perform the multicasting. Of course, the topology is unknown, so GARP has no idea which ports, if any, to which the attribute should be distributed. Instead of relying on a known topology, the modified GARP treats all of the intra-stack ports as enabled ports and distributes the attributes to each port.

If any switches are coupled to any of those ports, their respective GARPs will receive the attribute along with a registration command. In response to the registration command, the GARPs report the attribute to their local distributed dictionary applications and forward the attributes on to each of their respective intra-stack ports with the exception of the port from which the attribute was received. This process is discussed in more detail below with respect to FIG. 4. With each switch reporting and forwarding the attribute, the attribute will eventually be distributed throughout the network.

Distributing attributes as discussed above works fine unless there is a loop in the network. A loop is where at least two nodes are connected by more than one path so that data can travel around the path. For instance, referring briefly to FIG. 2, if an additional cable 260 connected switch 110 directly to switch 130, then the three switches, 110, 120, and 130, would be nodes in a loop. Since the topology is unknown, GARP cannot detect a loop based on the topology. If a multicast attribute enters a loop in the stack, the attribute may continuously circulate as each node in the loop forwards it on to the next node. As discussed below with respect to FIG. 5, GARP is modified to handle loops.

Returning to FIG. 3, in block 350, the switch monitors the value associated with the key to see if it changes. In the illustrated embodiment, if the value does not change, the switch delays for a time in block 360 and then multicasts the attribute again in block 340. The switch will continue to loop until the value changes. This looping provides a refresh of the attribute on a regular basis to protect against lost data. Also, in one embodiment, attributes are stored only for a limited time to prevent old data from accumulating in the dictionary. Periodically refreshing helps maintain current data.

In block 350, when and if the value changes, the switch deregisters the attribute in block 370 and returns to loop through the process again from block 310. As discussed above, GARP can deregister attributes in a number of ways.

By performing the embodiment illustrated in FIG. 3 at every switch in the stack, and for every intra-stack port on every switch for which a current value exists, each switch maintains current data with respect to its ports and provides that current data to the rest of the switches through the distributed dictionary.

Figure 4:
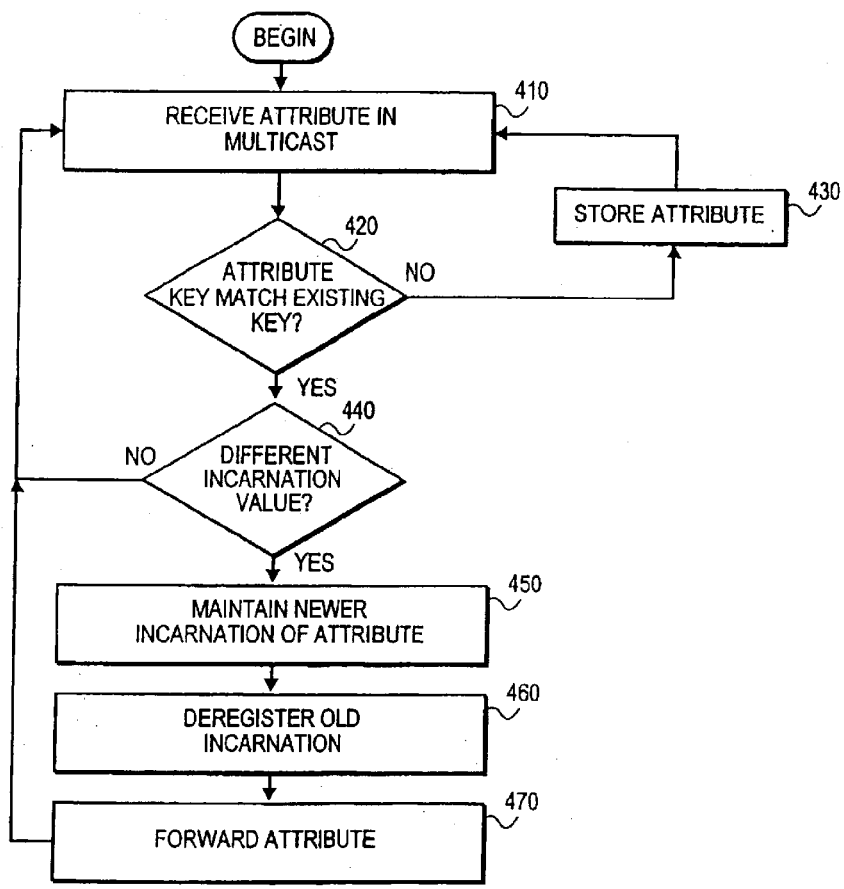
FIG. 4 demonstrates another embodiment of a distributed dictionary.

FIG. 4 illustrates another embodiment of the first invention. The illustrated process is used by an individual switch to monitor and update its distributed dictionary with respect to information reported from other switches.

In block 410, the switch receives an attribute for registration as part of a multicast from another switch. Again, GARP can be used for this purpose. In block 420, a key from the attribute is used as an index into the switch's locally stored version of the distributed dictionary to see if the key from the attribute matches a previously stored key. If there is no matching key, then the attribute is new and it is stored by the distributed dictionary application in block 430. For instance, when the stack is first configured, the attributes will need to be stored as they are distributed.

In block 420, if the key matches a previously stored key, the switch checks in block 440 to see if the attribute has a different incarnation value. If it does not have a different incarnation value, then the attribute is likely just a refresh of an earlier received attribute. In the illustrated embodiment, the switch just returns to block 410 to wait for the next attribute to arrive. In an alternate embodiment in which attributes have limited life spans, the repeated attribute many replace the currently stored attribute or the switch may simply reset a time on the attributes the attribute's life span.

In block 440, if the incarnation value is different, the value associated with the key has changed since it was previously stored. In block 450, the newer incarnation is maintained, and in block 460 the older incarnation is deregistered. As discussed above, attributes can be deregistered in any number of ways. In block 470, the attributed is forwarded to each intra-stack port on the switch with the exception of the port on which the attribute was received.

If the process of FIG. 4 is performed by each switch in the stack for each multicast that is received, the switches will maintain current attributes in the distributed dictionary. In which case, when attributes are presented to an application in a switch for various kinds of processing, the switch should receive the most recent attributes.

Figure 5:
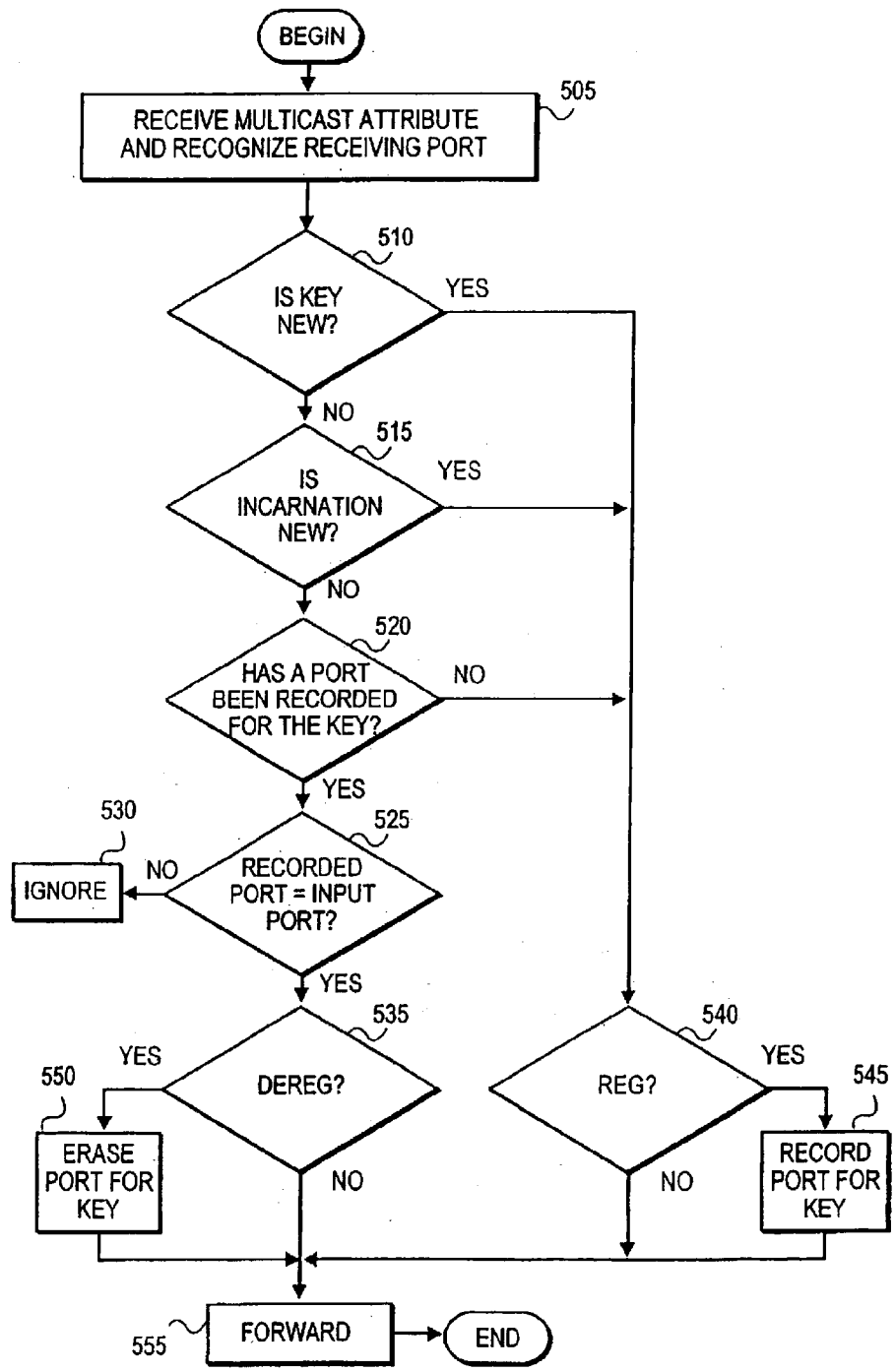
FIG. 5 demonstrates one embodiment of testing for loops.

FIG. 5 illustrates one embodiment of how GARP can be modified to protect against network loops when multicasting data in a network having an unknown topology. Basically, GARP determines if the same attribute has arrived at a node from more than one path. If it has, then the attribute is likely caught in a loop. In which case, GARP breaks the loop by not forwarding the attribute.

In block 505, GARP receives a multicast attribute and recognizes the port from which the attribute was received. The port can be a physical port, such as the intra-stack ports, or a virtual port, such as a port between GARP and an application within the node.

In block 510, GARP checks to see if the key for the attribute is new. If i is new, then the attribute is not likely caught in a loop. In which case, in block 540, if the attribute is accompanied by a registration command, the port number that the attribute arrived at is recorded in block 545. If the attribute is not for registration in block 540, the attribute is forwarded in block 555.

If the key is not new, in block 515, GARP checks to see if the incarnation for the key is new. If the incarnation is new, then the value of the attribute is new, suggesting that the attribute is not likely caught in a loop. In which case, the attribute gets the same treatment in blocks 540 and 545 as discussed above.

If the incarnation is not new, in block 520, GARP checks to see if a port number has been recorded for the key. If a port number has not been previously recorded for an attribute that has an old key and an old incarnation, the attribute is unlikely to be caught in a loop, and gets the same treatment in blocks 540 and 545 as discussed above.

If a port number has been recorded, in block 525, GARP checks to see if the port number of the current attribute matches the previously recorded port number. If it does not match, then the same attribute was received from two different ports. In which case, GARP ignores the attribute in block 530. If the port does match, then the attribute is likely a retransmission, and not caught in a loop.

In block 535, if the attributed is accompanied by a "deregistration" command, the port number recorded for the attribute is erased in block 550. If there is no "deregistration" command, GARP forwards the attribute in block 555.

Adjacency Monitoring

Figure 6:
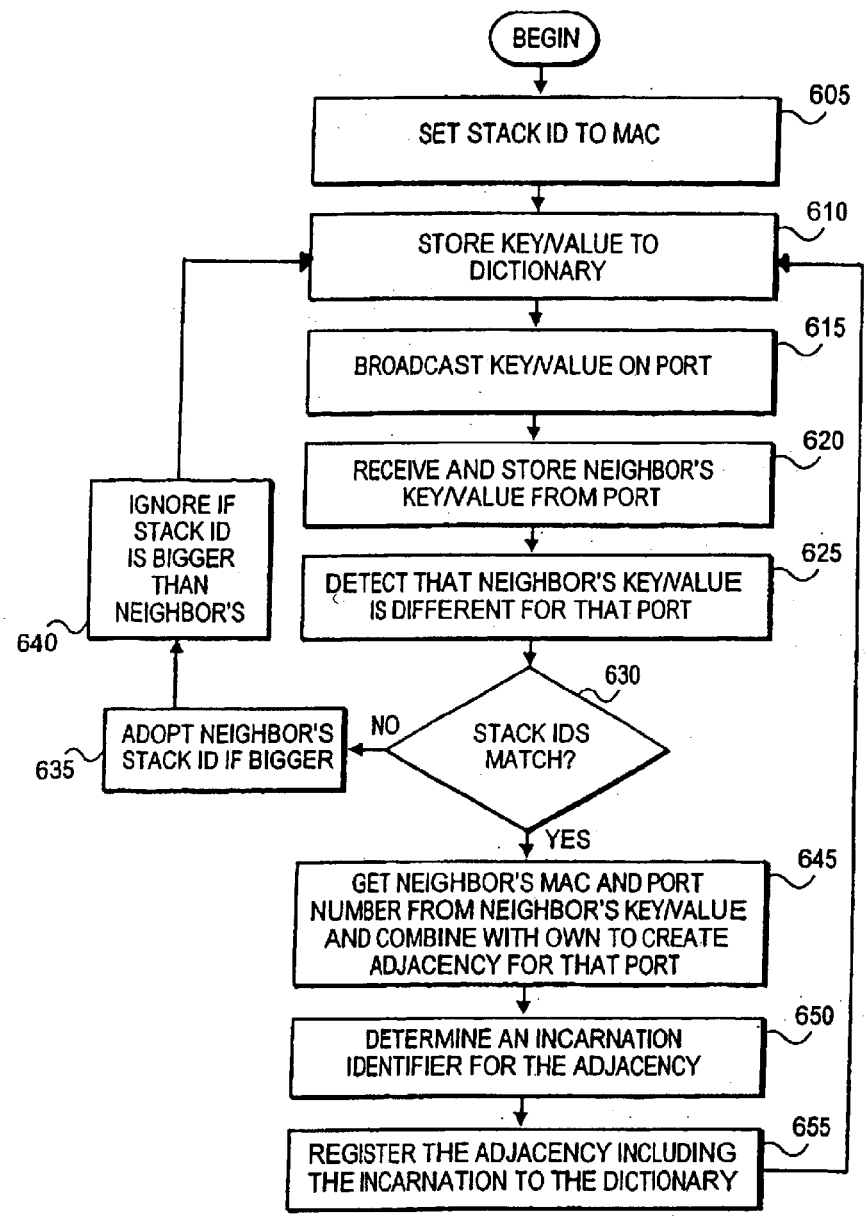
FIG. 6 demonstrates one embodiment of adjacency monitoring.

FIG. 6 illustrates one embodiment of the second invention. In the illustrated embodiment, a switch determines to which of its neighbors it is coupled and through which ports. These relationships are referred to as adjacencies. This process is likely to be the first step in automatically managing a network topology. As part of this initial process, the illustrated embodiment also selects a particular switch to coordinate topology management for the entire stack, and selects an identifier for the entire stack based on the selected switch. Even after all of the adjacencies for the stack have been initially determined, the process can continue to monitor adjacencies for any topology changes.

In block 605, a switch starts the process by using its media access control (MAC) address for its stack identifier. All of the switches in the stack will eventually adopt the same stack identifier in order to identify the stack to which they belong. In which case, the switch is likely to change its stack identifier later on.

When a switch is first coupled to a stack, the switch has no idea whether or not it has any neighbors. The switch starts out by assuming that it is alone. That is, the switch assumes that it is a stack of one, and it is the master of its stack. For this reason, the switch uses its own MAC address as the stack identifier.

In block 610, the switch locally stores attributes defining its own state. For instance, in the illustrated embodiment, the attributes are key/value pairs. As discussed above, the key is an index and the value is associated with the key. In one embodiment, the key is the switch's MAC address and the value is an intra-stack port number for a port on the switch and the stack identifier. In which case, the switch may store one attribute for each intra-stack port.

In block 615, the switch broadcasts each of the stored attributes on a corresponding port. The broadcast is point-to-point, as opposed to multicast, and is intended to go no further than an immediate neighbor. That is, if the attribute reaches a neighbor, the neighbor need not forward the attribute.

In block 620, the neighbor switches are doing the same thing, so the switch receives an attributed from a neighbor if the neighbor is coupled to the port. In block 625, the switch detects the presence of an attribute at one or more ports that does not match the attribute(s) broadcast from the respective port(s). That is, the switch detects that the neighbor's attribute is different from its own.

In block 630, the switch checks the stack identifiers to seen if they are the same. In the illustrated embodiment, if the switches do not agree on a stack identifier, the switches first negotiate for the stack identifier. The switches will not identify an adjacency among switches until they have agreed on a stack identifier.

Switches cannot be adjacent to one another for networking purposes if they are not part of the same stack. So, they agree on the stack identifier before determining adjacencies for a variety of reasons. As discussed below, in one embodiment, the stack identifier corresponds to a master switch. The adjacencies are used by the master switch to determine a topology for the stack.

If the master switch is yet to be designated, then there is no need to record an adjaceny.

If the stack identifiers do not match, in block 635, the switch will adopt the stack identifier of the neighbor if the neighbors stack identifier is larger than the switch's. In block 640, the switch ignores the attribute if the neighbor's stack identifier is smaller than the switches. Then the process returns to block 610 to loop through again.

If all of the switches process stack identifiers in the same way, the switch having the largest MAC address will ignore all of its neighbors' attributes until the neighbors adopt its MAC address as the stack identifier, and then the neighbors will ignore all of the attributes from their neighbors until their neighbors adopt the largest MAC address, and so on. In this fashion, the highest MAC address will propagate out to all of the switches until all of the switches agree on the highest MAC address for the stack identifier.

In alternate embodiments, rather than using the highest MAC address, the stack could adopt the lowest MAC address. In another embodiment, a user defined MAC address could be used. For instance, a user could set a stack identifier for a particular switch that is guaranteed to be higher than any MAC address so that the user-selected value gets adopted.

In one embodiment, the switch whose original stack identifier gets adopted by the stack is designated the master switch for the stack. So, by manipulating the original stack identifiers, a user can pre-select a particular switch to be the master switch if, for instance, one switch has more processing power than another. The importance of the master switch will be discussed below.

If in block 630 the stack identifiers do match, for instance, upon a second iteration through block 630, the switch obtains the neighbor's MAC address and port number from the attributes the neighbor sent and combines the neighbor's MAC address and port number with its own MAC address and port number to create an adjacency. In one embodiment, an adjacency comprises, key=(own MAC address, own Port number), and value=(neighbor's MAC address, and port number).

In block 650, the switch determines an incarnation identifier for the adjacency. If the switch was just powered up in the stack, the incarnation is likely to be an initial incarnation, such as one.

In block 655, the switch registers the adjacency and the incarnation in the distributed dictionary. As discussed above, since the topology is not yet known, GARP can be used to register the adjacency. Once the adjacency is registered, the process returns to block 610 to monitor the adjacencies for changes. If changes are detected, they are registered with a new incarnation number and the old incarnation is deregistered.

Topology Calculations

Figure 7:
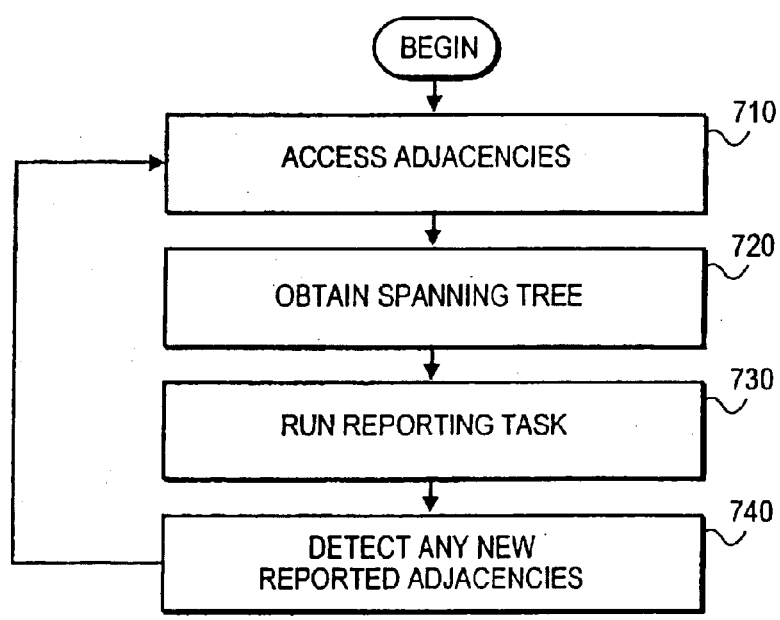
FIG. 7 demonstrates one embodiment of topology determination.

FIG. 7 illustrates one embodiment of the third invention. The illustrated process uses a set of adjacencies provided, for instance, by the second invention to obtain a network topology, also called a spanning tree.

In block 710, the master switch accesses the set of adjacencies in the distributed dictionary as reported by all of the switches. In block 720, the master switch provides the set of adjacencies to a graph-theory algorithm. In one embodiment, a known shortest path first (SPF) algorithm is used. The algorithm operates on a set of nodes and links between nodes to determine the shortest path between any two nodes. In one embodiment, SPF operates on the basis of propagation delay through the respective network paths. In addition to determining shortest paths, SPF also ensures that paths do not loop back on themselves, which could potentially cause lost data or other problems.

In block 730, when the master switch receives the spanning tree back from SPF, the master switch runs a reporting task, which is the subject matter of the fourth invention discussed below.

In block 740, the switch continues to monitor the reported adjacencies for changes. For instance, as discussed above, the adjacency monitor continues to update the set of adjacencies. If an adjacency changes, the process returns to block 710 to obtain a new topology.

Reporting Topology Calculations

Figure 8:
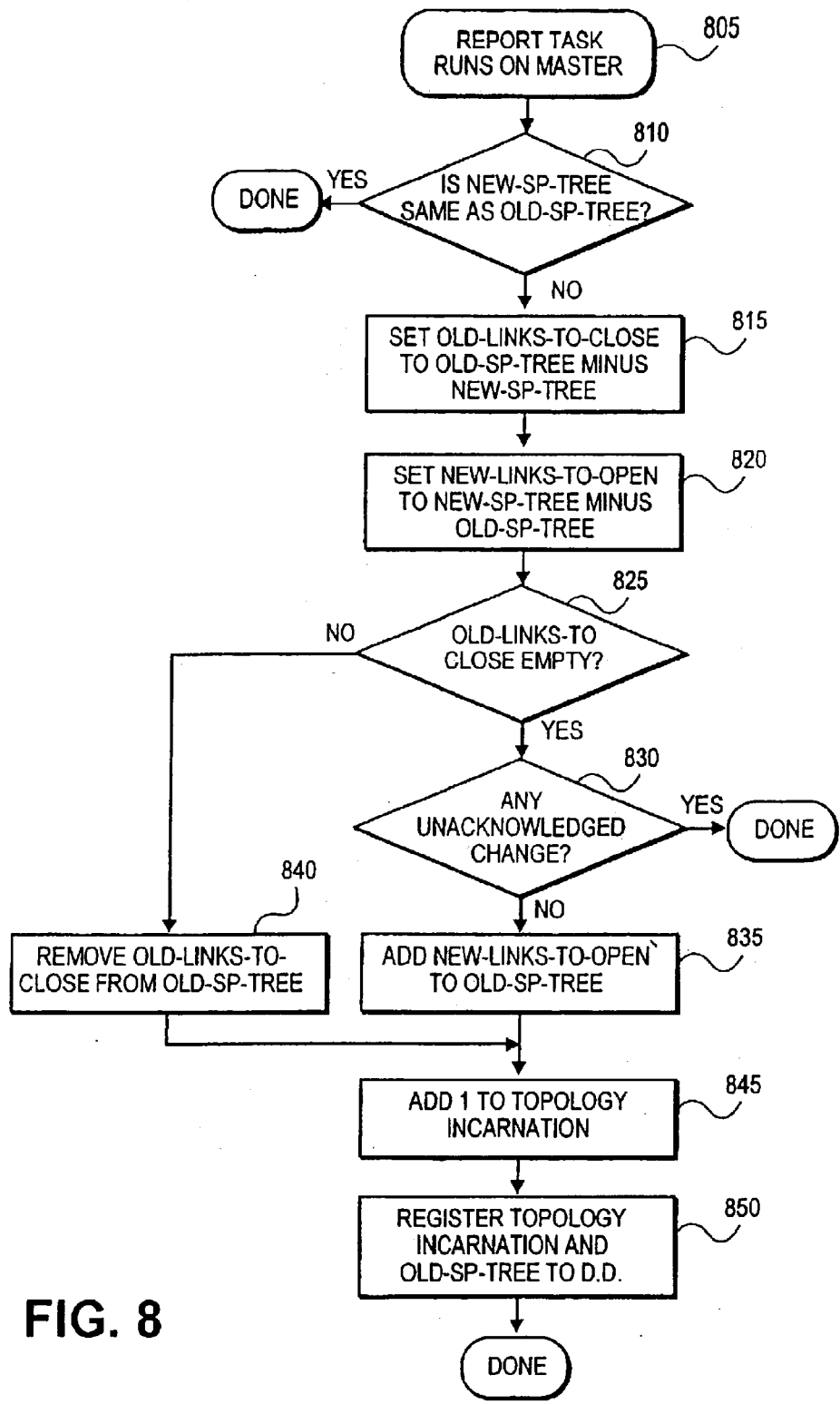
FIGS. 8–10 demonstrate embodiments of topology reporting and transient loop avoidance.
Figure 9:
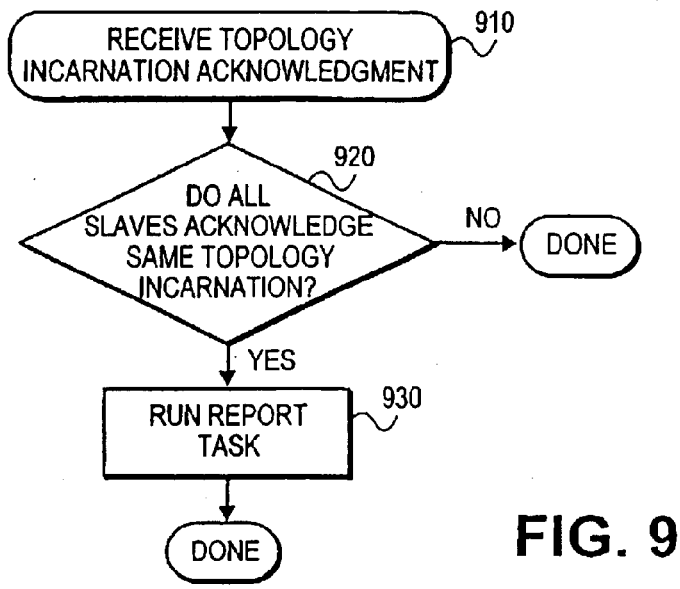
Figure 10:
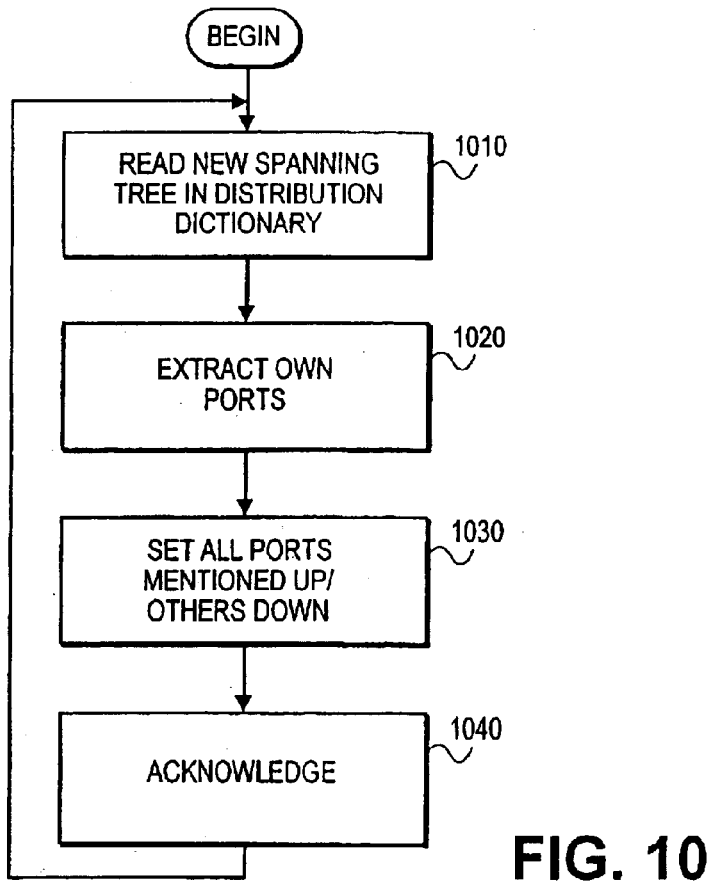

FIGS. 8 through 10 illustrate three embodiments of the fourth invention. Together, the illustrated embodiments report a new topology to the stack. The topology is used by the switches in the stack to direct data packets among the switches through the intra-stack ports. A new topology is reported in such a way so as to avoid transient loops.

As discussed above, SPF generates a topology without any loops. However, as is the case with autonomous routers, while transitioning from one topology to another, it is possible to experience transient loops. For instance, if a topology changes in the vicinity surrounding a set of routers, the routers will update to the new topology at their own discretion. In which case, since the routers are unlikely to all individually adopt the new topology at the same time, for at least a brief period, not all of the routers will be routing data using the same topology.

For instance, referring briefly to FIG. 2, if the topology where to change to include a cable 260 directly from switch 110 to switch 130, a transient loop may occur. That is, if the new link through the new cable were adopted before the old link was disabled, for a brief period of time, switches 110, 120, and 130 would be in a loop.

For routers, these transient loops are not fatal because routers have a higher tolerance for lost or misguided data. For instance, the data packets may have a limited life span, so the looping data will eventually time out and dissipate. Switches, however, have very low tolerance for even transient loops. Therefore, the fourth invention rolls out a new topology in a coordinated manner between the master switch and the rest of the switches to intentionally avoid, or at least reduce, the potential for problems caused by transient loops.

Basically, the fourth invention insures that all old links are disabled before new links are enabled. For instance, in the example above for the loop in FIG. 2, if the old link between switches 120 and 130 were disabled before the new link was formed between 110 and 130, no transient loop would occur. In one embodiment, a port is disabled only if it cannot send and cannot receive data, and it has no packets buffered and waiting for transmission. By including sending and receiving as requirements for disablement, a link can be disabled by disabling a port on just one end of the link.

In block 805, the reporting process is initiated when a new spanning tree is obtained as discussed above. In block 810, the master switch compares the new spanning tree to the old spanning tree. If the trees are the same, the process ends, and will be re-initiated when and if a new spanning tree is obtained. If the spanning tree is not the same, the process continues.

In block 815, the master switch determines the set of links to be disabled based on a comparison between the old spanning tree and the new spanning tree. In block 820, the master switch determines the set of links to be enabled based on a comparison of the two spanning trees.

In block 825, the master switch checks to see if there are any links to disable. As discussed above, if there are any links to be disabled, they should be disabled before any links are enabled to reduce the likelihood of transient loops.

In order to disable the links, the master switch removes the links to be disabled from the old spanning tree in block 840. Then, the master switch advances the incarnation identifier for the old spanning tree in block 845. And, in block 850, the spanning tree is registered to the distributed dictionary. In one embodiment, registering to the distributed dictionary is accomplished without relying on the topology as discussed above.

By registering the modified old spanning tree with a new incarnation identifier, the switches will recognize the change in the spanning tree and take appropriate action. Skipping to FIG. 10, FIG. 10 illustrates one embodiment of a process performed by each switch in response to registering the modified spanning tree.

In block 1010, the switch reads the modified spanning tree from the distributed dictionary. In block 1020, the switch extracts its own ports from the spanning tree. In block 1030, the switch enables all of the ports extracted from the spanning tree and disables all of the others. When the switch is done applying the modified spanning tree, the switch acknowledges completion in block 1040 by registering an acknowledgement to the distributed dictionary including the incarnation number of the modified spanning tree.

Meanwhile, as illustrated in FIG. 9, one embodiment of the master switch is monitoring the distributed dictionary for acknowledgements. Each time a new acknowledgement is received in block 910, the master checks to see if all of the switches have acknowledged with the most current incarnation number for the modified spanning tree in block 920. For instance, in one embodiment, the master identifies all of the switches based on the current topology and checks an incarnation number from a response from each. In other words, the master waits until all of the switches are synchronized. Once the switches are synchronized, the master runs a reporting process again, such as the one illustrated in FIG. 8.

Returning to FIG. 8, in block 805, the master performs a second iteration of the process when it determines that the slaves are all synchronized and have disabled the links identified in the previous iteration. In block 810, the master compares the old spanning tree, which includes the modifications from the first iteration through the reporting process, to the new spanning tree that was previously obtained as discussed above. If the changes from the old to the new only required that links be disabled, the spanning trees will be the same and the process will stop. If, however, the new spanning tree needs to have new links enabled, the process continues.

It should be noted that under certain circumstances, there may be cases in which disabling links in the first iteration may necessitate enabling and/or disabling additional links in the second iteration. In which case, in the illustrated embodiment, the process determines the links to disable and the links to enable again in blocks 815 and 820. In block 825, if additional links need to be disabled, the process will proceed as above to report the modified spanning tree and wait for the switches to synchronize. The reporting process may go through a number of iterations until the set of links to disable is finally empty.

In block 830, the process checks to see if any prior changes remain unacknowledged. The process is preparing to enable new links which, if the switches are not synchronized, could create transient links. So for instance, if in the first iteration through the reporting process, no links needed to be disabled, the process would verify that the switches are synchronized. If they are not, the reporting process ends until it is called again.

If the switches are synchronized in block 830, the master adds the new links to the old spanning tree (which may have been modified one or more times in previous iterations) in block 835, advances the incarnation identifier in block 845, and registers the spanning tree to the distributed dictionary.

Again, the switches will adopt the new spanning tree, for instance, as illustrated in FIG. 10, and when the master determines they are all synchronized, for instance, as illustrated in FIG. 9, the reporting process will be called again. In this iteration, in block 810, the spanning trees should match, ending the process.

Figure 11:
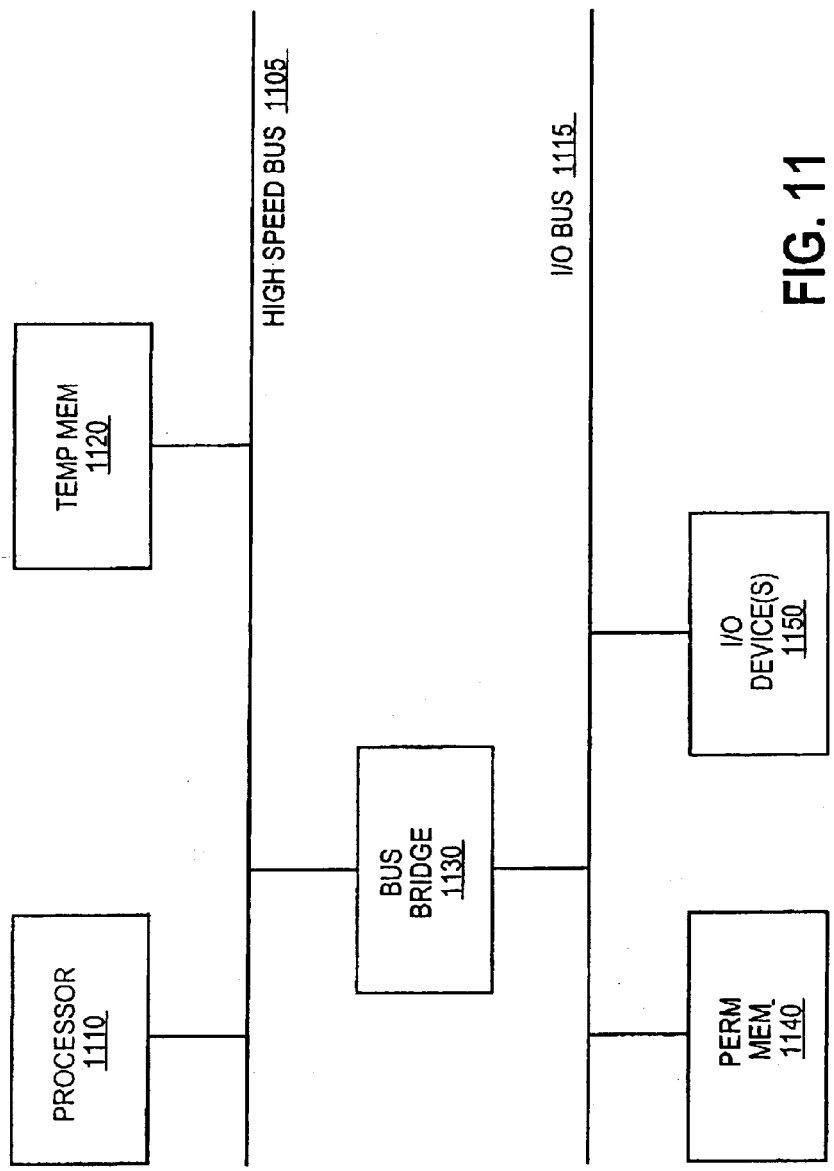
FIG. 11 illustrates one embodiment of a hardware system.

In all of the embodiments of all the inventions described herein, alternate embodiments may not require all of the elements shown, may include additional elements, and may perform one or more elements in a different order. Furthermore, even though the embodiments were illustrated in the context of a switch stack, the inventions are applicable to a wide variety of alternate network environments as well:

FIG. 11 illustrates one embodiment of a hardware system intended to represent a broad category of network devices such as personal computers, workstations, switches, routers, and/or embedded systems. In the illustrated embodiment, the hardware system includes processor 1110 coupled to high speed bus 1105, which is coupled to input/output (I/O) bus 1115 through bus bridge 1130. Temporary memory 1120 is coupled to bus 1105. Permanent memory 1140 is coupled to bus 1115. I/O device(s) 1150 is also couple to bus 1115. I/O device(s) 1150 may include a display device, a keyboard, one or more external network interfaces, etc.

Certain embodiments may include additional components, may not require all of the above components, or may combine one or more components. For instance, temporary memory 1120 may be on-chip with processor 1110. Alternately, permanent memory 1140 may be eliminated and temporary memory 1120 may be replaced with an electrically erasable programmable read only memory (EEPROM), wherein software routines are executed in place from the EEPROM. Some implementations may employ a single bus, to which all of the components are coupled, or one or more additional buses and bus bridges to which various additional components can be coupled. Those skilled in the art will be familiar with a variety of alternate internal networks including, for instance, an internal network based on a high speed system bus with a memory controller hub and an I/O controller hub. Additional components may include additional processors, a CD ROM drive, additional memories, and other peripheral components known in the art.

In one embodiment, the present invention, as described above, is implemented using one or more computers such as the hardware system of FIG. 11. Where more than one computer is used, the systems can be coupled to communicate over an external network, such as a local area network (LAN), an IP network, etc. In one embodiment, the present invention is implemented as software routines executed by one or more execution units within the computer(s). For a given computer, the software routines can be stored on a storage device, such as permanent memory 1140.

Figure 12:
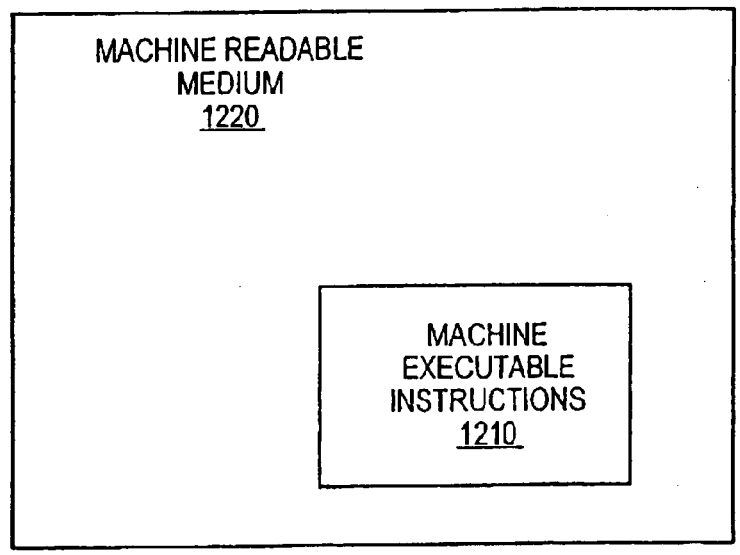
FIG. 12 illustrates one embodiment of a machine readable storage medium.

Alternately, as shown in FIG. 12, the software routines can be machine executable instructions 1210 stored using any machine readable storage medium 1220, such as a diskette, CD-ROM, magnetic tape, digital video or versatile disk (DVD), laser disk, ROM, Flash memory, etc. The series of instructions need not be stored locally, and could be received from a remote storage device, such as a server on a network, a CD ROM device, a floppy disk, etc., through, for instance, I/O device 1150 of FIG. 11.

From whatever source, the instructions may be copied from the storage device into temporary memory 1120 and then accessed and executed by processor 1110. In one implementation, these software routines are written in the C programming language. It is to be appreciated, however, that these routines may be implemented in any of a wide variety of programming languages.

In alternate embodiments, the present invention is implemented in discrete hardware or firmware. For example, one or more application specific integrated circuits (ASICs) could be programmed with one or more of the above described functions of the present invention. In another example, one or more functions of the present invention could be implemented in one or more ASICs on additional circuit boards and the circuit boards could be inserted into the computer(s) described above. In another example, field programmable gate arrays (FPGAs) or static programmable gate arrays (SPGA) could be used to implement one or more functions of the present invention. In yet another example, a combination of hardware and software could be used to implement one or more functions of the present invention.

Thus, a suite of network-related inventions is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. A method comprising:
    reporting a spanning tree to a distributed dictionary for a plurality of nodes comprising a network, said plurality of nodes to adopt the spanning tree from the distributed dictionary in a coordinated manner to avoid a transient topology loon in the network, wherein reporting the spanning tree comprises:
        performing at least one iteration of a reporting task to disable links to be removed from among the plurality of nodes, wherein the at least one iteration of the reporting task comprises:
            identifying the links to be removed based on a comparison of the spanning tree to a previous spanning tree;
            removing the links to be removed from the previous spanning tree to generate a modified spanning tree; and
            registering the modified spanning tree to the distributed dictionary; and
        performing at least one additional iteration of the reporting task to enable links to be added among the plurality of nodes only after the links to be removed have been disabled.

2. The method of claim 1 wherein registering the modified spanning tree comprises:
    identifying an incarnation identifier for the previous spanning tree;
    advancing the incarnation identifier; and
    combining the incarnation identifier with the modified spanning tree.

3. The method of claim 1 wherein registering the modified spanning tree comprises:
    storing the modified spanning tree to local memory; and
    multicasting the spanning tree to a remainder of the plurality of nodes.

4. A method comprising:
    reporting a spanning tree to a distributed dictionary for a plurality of nodes comprising a network, said plurality of nodes to adopt the spanning tree from the distributed dictionary in a coordinated manner to avoid a transient topology loop in the network, wherein reporting the spanning tree comprises:

performing at least one iteration of a reporting task to disable links to be removed from among the plurality of nodes; and performing at least one additional iteration of the reporting task to enable links to be added among the plurality of nodes only after the links to be removed have been disabled, wherein the at least one additional iteration of the reporting task comprises:

identifying the links to be added based on a comparison of the spanning tree to a previous spanning tree;

verifying there are no remaining links to be removed;

verifying that the plurality of nodes are synchronized with respect to adoption of the previous spanning tree;

adding the links to be added to the previous spanning tree to generate a modified spanning tree; and registering the modified spanning tree to the distributed dictionary.

5. The method of claim 4 wherein verifying there are no remaining links comprises:

subtracting a set of links defined by the spanning tree from a set of links defined by the previous spanning tree to provide a result;

verifying that the result is a null set;

accessing a set of acknowledgements from the plurality of nodes registered in the distributed dictionary; and verifying that an incarnation identifier for each acknowledgement in the set of acknowledgements is equal.

6. A method comprising:

reporting a spanning tree to a distributed dictionary for a plurality of nodes comprising a network, said plurality of nodes to adopt the spanning tree from the distributed dictionary in a coordinated manner to avoid a transient topology loop in the network, wherein reporting the spanning tree comprises:

performing at least one iteration of a reporting task to disable links to be removed from among the plurality of nodes; and performing at least one additional iteration of the reporting task to enable links to be added among the plurality of nodes only after the links to be removed have been disabled, wherein prior to performing a next iteration of the reporting task, the method further comprises:

accessing acknowledgements from the plurality of nodes in the distributed dictionary, said acknowledgements including incarnation identifiers for a most current spanning tree adopted by respective ones of the plurality of nodes;

identifying a lowest incarnation identifier stored in the distributed dictionary;

comparing the lowest incarnation identifier to an incarnation identifier of a most recently reported spanning tree; and initiating the next iteration of the reporting task if the lowest incarnation identifier is equal to the incarnation identifier of the most recently reported spanning tree.

7. A method comprising:

adopting a spanning tree from a distributed dictionary in a manner coordinated throughout a plurality of nodes comprising a network to avoid a transient topology loop in the network; wherein adopting the spanning tree comprises:

identifying the spanning tree as a new spanning tree in the distributed dictionary;

extracting ports from the new spanning tree corresponding to a particular node;

disabling any ports at the particular node not extracted from the new spanning tree; and enabling any ports at the particular node after disabling any ports not extracted from the new spanning tree.

8. The method of claim 7 further comprising:

acknowledging an adoption of the spanning tree.

9. The method of claim 8 wherein acknowledging adoption of the spanning tree comprises:

registering an incarnation identifier of a most currently adopted spanning tree to the distributed dictionary.

10. The method of claim 7 wherein identifying the spanning tree as the new spanning tree comprises:

receiving the spanning tree at the particular node, said spanning tree including an incarnation identifier;

retrieving an incarnation identifier for an entry in the distributed dictionary corresponding to the spanning tree;

comparing the incarnation identifier of the spanning tree to the incarnation identifier for the entry; and identifying the spanning tree as a new spanning tree if the incarnation identifier for the entry is older than the incarnation identifier for the spanning tree.

11. An article comprising:

a machine readable storage medium having stored thereon executable instructions to implement reporting a spanning tree to a distributed dictionary for a plurality of nodes comprising a network, said plurality of nodes to adopt the spanning tree from the distributed dictionary in a coordinated manner to avoid a transient topology loop in the network, wherein the reporting the spanning tree comprises:

performing at least one iteration of a reporting task to disable links to be removed from among the plurality of nodes, wherein the at least one iteration of the reporting task comprises:

identifying the links to be removed based on a comparison of the spanning tree to a previous spanning tree;

removing the links to be removed from the previous spanning tree to generate a modified spanning tree; and registering the modified spanning tree to the distributed dictionary; and performing at least one additional iteration of the reporting task to enable links to be added among the plurality of nodes only after the links to be removed have been disabled.

12. The article of claim 11 wherein registering the modified spanning tree comprises:

identifying an incarnation identifier for the previous spanning tree;

advancing the incarnation identifier; and combining the incarnation identifier with the modified spanning tree.

13. The article of claim 11 wherein registering the modified spanning tree comprises:

storing the modified spanning tree to local memory; and multicasting the spanning tree to a remainder of the plurality of nodes.

14. An article comprising:

a machine readable storage medium having stored thereon executable instructions to implement reporting a spanning tree to a distributed dictionary a for a plurality of nodes comprising a network, said plurality of nodes to adopt the spanning tree from the distributed dictionary in a coordinated manner to avoid a transient topology loop in the network; wherein reporting the spanning tree comprises:

performing at least one iteration of a reporting task to disable links to be removed from among the plurality of nodes; and performing at least one additional iteration of the reporting task to enable links to be added among the plurality of nodes only after the links to be removed have been disabled, wherein the at least one additional iteration of the reporting task comprises:

identifying the links to be added based on a comparison of the spanning tree to a previous spanning tree;

verifying there are no remaining links to be removed;

verifying that the plurality of nodes are synchronized with respect to adoption of the previous spanning tree;

adding the links to be added to the previous spanning tree to generate a modified spanning tree; and registering the modified spanning tree to the distributed dictionary.

15. The article of claim 14 wherein verifying there are no remaining links comprises:

subtracting a set of links defined by the spanning tree from a set of links defined by the previous spanning tree to provide a result;

verifying that the result is a null set;

accessing a set of acknowledgements from the plurality of nodes registered in the distributed dictionary; and verifying that an incarnation identifier for each acknowledgement in the set of acknowledgements is equal.

16. An article comprising:

a machine readable storage medium having stored thereon executable instructions to implement reporting a spanning tree to a distributed dictionary for a plurality of nodes comprising a network, said plurality of nodes to adopt the spanning tree from the distributed dictionary in a coordinated manner to avoid a transient topology loop in the network, wherein reporting the spanning tree comprises:

performing at least one iteration of a reporting task to disable links to be removed from among the plurality of nodes; and performing at least one additional iteration of the reporting task to enable links to be added among the plurality of nodes only after the links to be removed have been disabled, wherein prior to performing a next iteration of the reporting task, the executable instructions further implement:

accessing acknowledgements from the plurality of nodes in the distributed dictionary, said acknowledgements including incarnation identifiers for a most current spanning tree adopted by respective ones of the plurality of nodes;

identifying a lowest incarnation identifier stored in the distributed dictionary;

comparing the lowest incarnation identifier to an incarnation identifier of a most recently reported spanning tree; and initiating the next iteration of the reporting task if the lowest incarnation identifier is equal to the incarnation identifier of the most recently reported spanning tree.

17. An article comprising:

a machine readable storage medium having stored thereon executable instructions to implement adopting a spanning tree from a distributed dictionary in a manner coordinated throughout a plurality of nodes comprising a network to avoid a transient topology loop in the network, wherein adopting the spanning tree comprises:

identifying the spanning tree as a new spanning tree in the distributed dictionary;

extracting ports from the new spanning tree corresponding to a particular node;

disabling any ports at the particular node not extracted from the new spanning tree; and enabling any ports at the particular node after disabling any ports not extracted from the new spanning tree.

18. The article of claim 17 wherein the executable instructions further implement:

acknowledging an adoption of the spanning tree.

19. The article of claim 18 wherein acknowledging adoption of the spanning tree comprises:

registering an incarnation identifier of a most currently adopted spanning tree to the distributed dictionary.

20. The article of claim 17 wherein identifying the spanning tree as the new spanning tree comprises:

receiving the spanning tree at the particular node, said spanning tree including an incarnation identifier;

retrieving an incarnation identifier for an entry in the distributed dictionary corresponding to the spanning tree;

comparing the incarnation identifier of the spanning tree to the incarnation identifier for the entry; and identifying the spanning tree as a new spanning tree if the incarnation identifier for the entry is older than the incarnation identifier for the spanning tree.

* * * * *

UNITED STATES PATENT AND TRADEMARK OFFICE
CERTIFICATE OF CORRECTION

PATENT NO. : 6,954,437 B1
DATED : October 11, 2005
INVENTOR(S) : Sylvest et al.

It is certified that error appears in the above-identified patent and that said Letters Patent is hereby corrected as shown below:

Column 6,
Line 15, delete "the attributes".

Column 15,
Line 1, delete the second occurrence of "the".

Signed and Sealed this

Thirteenth Day of December, 2005

JON W. DUDAS
*Director of the United States Patent and Trademark Office*